(12) United States Patent
Whitehead et al.

(10) Patent No.: US 10,994,782 B2
(45) Date of Patent: May 4, 2021

(54) METHOD AND APPARATUS FOR ATTACHING CROSSMEMBERS TO A PAIR OF FLANGED BEAMS

(71) Applicant: Western Trailer Co., Boise, ID (US)

(72) Inventors: Jerald M. Whitehead, Boise, ID (US); Todd H. Swanstrom, Boise, ID (US)

(73) Assignee: Western Trailer Co., Boise, ID (US)

( * ) Notice: Subject to any disclaimer, the term of this patent is extended or adjusted under 35 U.S.C. 154(b) by 353 days.

(21) Appl. No.: 16/189,975

(22) Filed: Nov. 13, 2018

(65) Prior Publication Data

US 2020/0148265 A1    May 14, 2020

(51) Int. Cl.
| | |
|---|---|
| *B62D 21/03* | (2006.01) |
| *B62D 65/02* | (2006.01) |
| *B62D 53/06* | (2006.01) |
| *B62D 21/20* | (2006.01) |

(52) U.S. Cl.
CPC ............ *B62D 21/03* (2013.01); *B62D 21/20* (2013.01); *B62D 53/061* (2013.01); *B62D 65/024* (2013.01)

(58) Field of Classification Search
CPC ...... B62D 21/03; B62D 21/20; B62D 53/061; B62D 65/024; B62D 21/02; B62D 21/11; B62D 27/023; B62D 53/068; B60G 2206/60
USPC ........................................................ 280/781
See application file for complete search history.

(56) References Cited

U.S. PATENT DOCUMENTS

| | | | |
|---|---|---|---|
| 3,043,628 A | 7/1962 | Hockensmith, Jr. | |
| 5,215,331 A * | 6/1993 | Pittman | B60G 11/225 280/788 |
| 6,213,507 B1 * | 4/2001 | Ramsey | B60G 7/02 280/683 |
| 7,766,352 B2 * | 8/2010 | Keeler | B60G 7/001 280/124.116 |
| 8,006,990 B1 * | 8/2011 | Davis | B60G 11/10 280/124.175 |
| 9,783,238 B2 | 10/2017 | Garceau | |
| 2005/0082814 A1 * | 4/2005 | Ramsey | B62D 53/068 280/793 |

(Continued)

FOREIGN PATENT DOCUMENTS

EP    3569427 A1 *  11/2019  ............ B62D 21/03

*Primary Examiner* — John D Walters
*Assistant Examiner* — Hilary L Johns
(74) *Attorney, Agent, or Firm* — Christensen O'Connor Johnson Kindness, PLLC (57) ABSTRACT

A pair of elongate attachment members, or "Z-rails" for attaching an end of a trailer crossmember to a flanged beam each include a first end section, an L-shaped portion comprising a horizontal leg and a vertical leg extending from the first end section, and a second end section extending from the vertical leg. The horizontal leg has a bottom surface with a width equal to the distance between the web of the flanged beam and the end of the flange. The vertical leg has an outer surface with a width equal to the width of the end of the flange. The Z-rails are attached to opposite ends of the crossmember to form a subassembly. The subassembly is fixed to and between the flanged beams by welding the first end sections to the web of the corresponding beam, with the horizontal leg on the flange, without directly heating the flange, thereby not diminishing the toughness of the flange.

8 Claims, 9 Drawing Sheets

(56) References Cited

U.S. PATENT DOCUMENTS

| | | | | |
|---|---|---|---|---|
| 2010/0299891 A1* | 12/2010 | Myers | .................. | F16B 7/0493 |
| | | | | 24/457 |
| 2013/0001913 A1* | 1/2013 | Aalderink | .............. | B60G 11/27 |
| | | | | 280/124.153 |
| 2013/0300097 A1* | 11/2013 | Garceau | ............... | B62D 27/023 |
| | | | | 280/789 |
| 2018/0029647 A1 | 2/2018 | Garceau | | |

* cited by examiner

FIG. 6C

METHOD AND APPARATUS FOR ATTACHING CROSSMEMBERS TO A PAIR OF FLANGED BEAMS

BACKGROUND

Commercial trailers, for example, full trailers and semi-trailers, are well known in the art and are produced and configured in various styles and for a wide variety of industries to accommodate the particular trailering needs of different applications. For example, Western Trailers® brand trailers, by Western Trailer Co. are available as platform trailers (for example, flatbed, drop deck or step-frame, and hopper flat trailers), agricultural trailers (for example, commodity belt, express floor, and hopper flat trailers), forest industry trailers (for example, chip and express floor trailers), curtainsider trailers or "tautliners," and specialty trailers for the military, aerospace, glass, and wind power industries. The most common type of trailers is box or van trailers.

Conventionally, a semi-trailer includes one or more (typically more) rear axles and a front end that is configured to be supported by the prime mover (tractor), or in the case of an additional towed trailer, supported by a trailer dolly. Full trailers include one or more front axles and one or more rear axles that support the trailer.

The chassis (or frame) of a platform (or flatbed) trailer typically includes two parallel main beams that extend along all or substantially all of the length of the trailer, and a plurality of connecting crossmembers that are fixedly attached to the main beams to produce a sturdy frame. The chassis provides a support structure for other trailer components, including for example, suspension components, a trailer stand, a fifth-wheel kingpin coupling, and the like.

In some embodiments the main beams are tempered steel beams, for example, I-beams, channel beams, or the like. In other embodiments the main beams may have a different cross-section shape, for example, C-shaped or channel beams. In other embodiments the main beams are formed from other metal or metal alloys, for example, heat-treated, or tempered, aluminum alloys.

In prior art trailers the crossmembers are welded directly to the main beams, to produce a fixed and permanent connection that can withstand the rigors and miles that the trailer is expected to encounter. However, heating the tempered metal by welding can weaken the main beams locally by interfering with the design tempering of the beams. Frequently, a plurality of crossmembers are fixed to the main beams in relatively close spacing, for example, to provide a mounting and support structure for a particular trailer component, such as a coupler assembly, a suspension assembly, or the like. Sequentially welding a plurality of crossmembers to the main beams may result in significant de-tempering in the impacted region of the main beams due to the heating of the main beams over a longer installation period. Welding multiple crossbeams to the main beams within a short distance can also be difficult for the welder who must accurately position the crossmembers sequentially while working around earlier-installed crossmembers.

It is desirable to weld crossmembers to the main beams of trailers in a manner that would reduce interference with the engineered tempering of the main beams, and that would allow a plurality of crossmembers to be installed in a single installation.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for fixing a crossmember to a vehicle frame having a flanged first beam and a flanged second beam, wherein the beam flange has an upper surface with a first width and an end surface having a second width, includes fabricating a crossmember assembly by fixing a first elongate attachment member ("first Z-rail") to one end of the crossmember and fixing a second elongate attachment member ("second Z-rail") to an opposite end of the crossmember. The Z-rails each include (i) a first end section, (ii) an L-shaped portion comprising a horizontal leg extending from the first end section and a vertical leg extending from the horizontal leg, and (iii) a second end section extending from a bottom end of the vertical leg. The horizontal leg of the L-shaped section defines a lower surface having a width equal to the flange first width and the second leg defines an outer surface having a width equal to the flange second width. The method includes positioning the crossmember subassembly on the first and second flanged beams such that the horizontal leg of the first Z-rail abuts the first surface of the first beam flange and the vertical leg of the first Z-rail abuts the end surface of the first beam flange, and such that the horizontal leg of the second Z-rail abuts the first surface of the second beam flange and the vertical leg of the second Z-rail abuts the end surface of the second beam flange. The method further includes welding the first end section of the first Z-rail to the web of the first beam without directly heating the first beam flange, and welding the first end section of the second Z-rail to the web of the second beam without directly heating the second beam flange.

In an embodiment the first beam and the second beam comprise I-beams or channel beams.

In an embodiment a plurality of crossmembers are attached to the beam, and the method includes fixing all of the plurality of crossmembers to the first and second elongate attachment members.

In an embodiment the first Z-rail second end section is perpendicular to the first Z-rail vertical leg, and a bottom surface of the first Z-rail second end section is coplanar with a bottom surface of the flange of the first beam.

In an embodiment fabricating the crossmember subassembly includes bolting the crossmember flange to the second end section of the first and second Z-rails.

In an embodiment the method includes bolting the L-shaped portion of the first Z-rail to the first beam flange and bolting the second Z-rail to the second beam flange.

In an embodiment the second end sections of the first and second Z-rails include a first portion and a second portion, wherein the second portion is spaced apart from the first portion.

An elongate attachment member for attaching an end of a crossmember to a main beam of a trailer, wherein the main beam having a web portion and a flange extending away from the web portion, wherein the flange defines an upper surface having a first width and an end surface having a second width includes a first end section, an L-shaped portion comprising a horizontal leg extending from the first end section and a vertical leg extending from the horizontal leg, and a second end section extending from a bottom end of the vertical leg. The horizontal leg defines a lower surface having a width equal to the first width and the vertical leg of the L-shaped portion defines an outer surface having a width equal to the second width.

In an embodiment the elongate attachment member is configured to attach a plurality of crossmembers to the main beam.

In an embodiment the second end section is perpendicular to the vertical leg of the L-shaped portion, and the first end section is perpendicular to the horizontal leg of the L-shaped portion.

In an embodiment the horizontal leg is configured to be bolted to the flange and the second end section is configured to be bolted to the crossmember.

In an embodiment the second end section comprises a first portion and a second portion spaced apart from the first portion.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
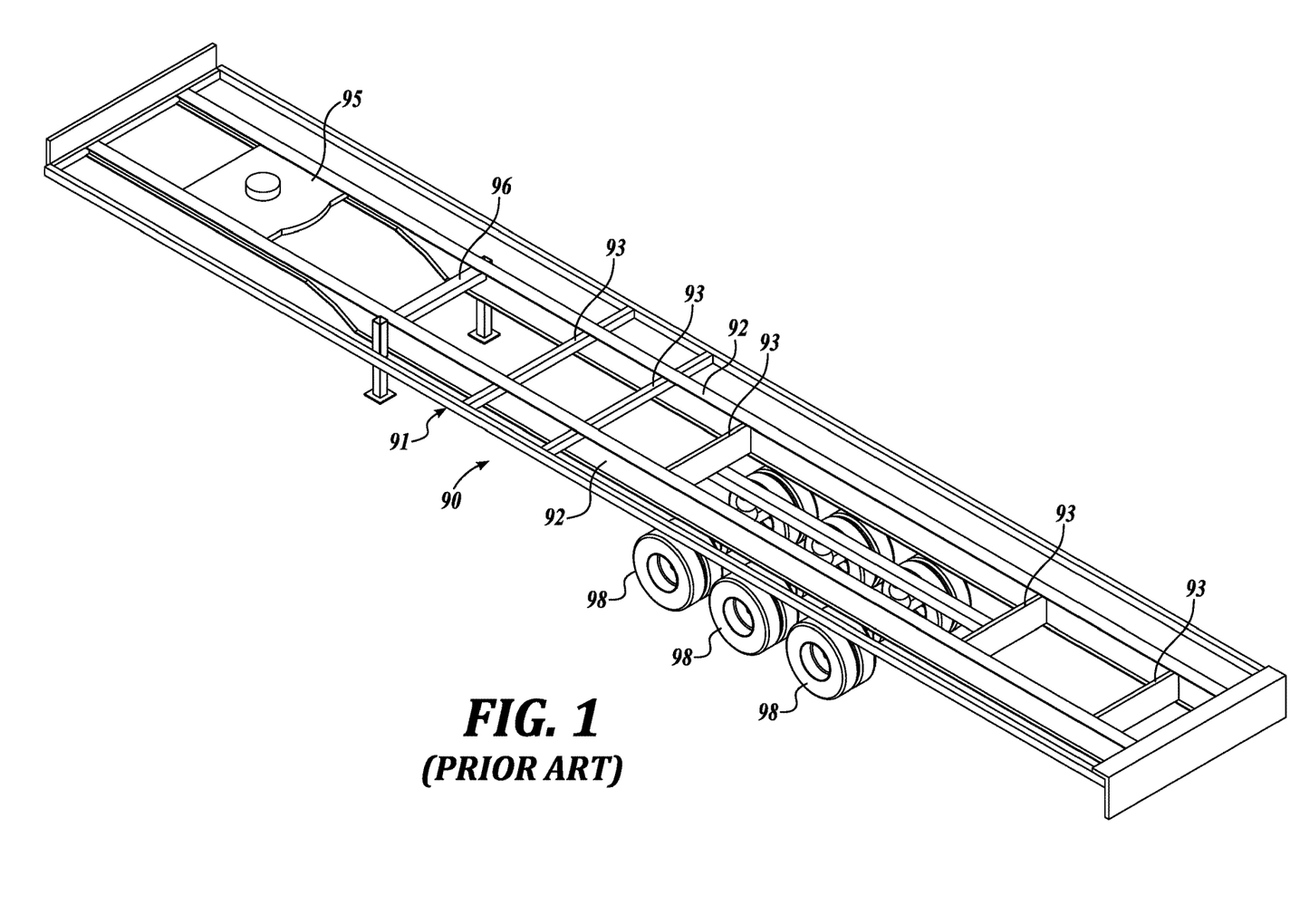
FIG. 1 illustrates a conventional frame structure for a trailer having opposed main beams and a plurality of crossmembers.

FIG. 1 illustrates a vehicle trailer frame 91 for a conventional trailer 90. The trailer frame 91 includes two main beams 92 that are parallel and extend substantially along the length of the trailer 90. The main beams 92 are connected with a plurality of crossmembers 93 that cooperatively define the structural frame 91, and provide various components or support for such components. Additional crossmember assemblies include a kingpin assembly 95, support legs 96, a suspension assembly (not shown), and the like, as are known in the art.

The main beams 92 provide the primary support structure for the trailer 90 on the axle assemblies 98 (three shown), and must support significant dynamic loads encountered during operation of the trailer 90. The main beams 92 are typically flanged steel or aluminum alloy beams, for example, I-beams (with an upper flange, a lower flange, and a web portion connecting the upper and lower flanges), channel or C-beams, W-beams, or the like. The dynamic loads produce bending moments on the beam that are substantially reacted in the beam 92 flanges. In order to withstand and react these loads the main beams 92 are generally heat treated to provide a desired combination of strength and ductility, sometimes referred to as the toughness of the beams.

To achieve a desired toughness the beams 92 may initially be hardened using a quenching process wherein the beams 92 are heated to a predetermined temperature and then cooled in a rapid and controlled quenching process. After quenching, the beams are typically undesirably hard and brittle due to Martensite formed in the steel during the quenching process. The beams are therefore tempered to reduce the brittleness of the steel. Tempering involves heating the hardened steel to a prescribed temperature selected to achieve the desired toughness, which may be defined as the ability of the steel to absorb energy and deform without fracturing. The heating/tempering process is carefully controlled to achieve the desired toughness.

In prior art frames, the construction of the frame 91 typically includes welding some or all of the crossmembers to the main beams 92. However, heating the main beams 92 during welding can undermine the tempering process, changing the local toughness properties of the main beam 92, which can lead to premature failures.

Figure 2A:
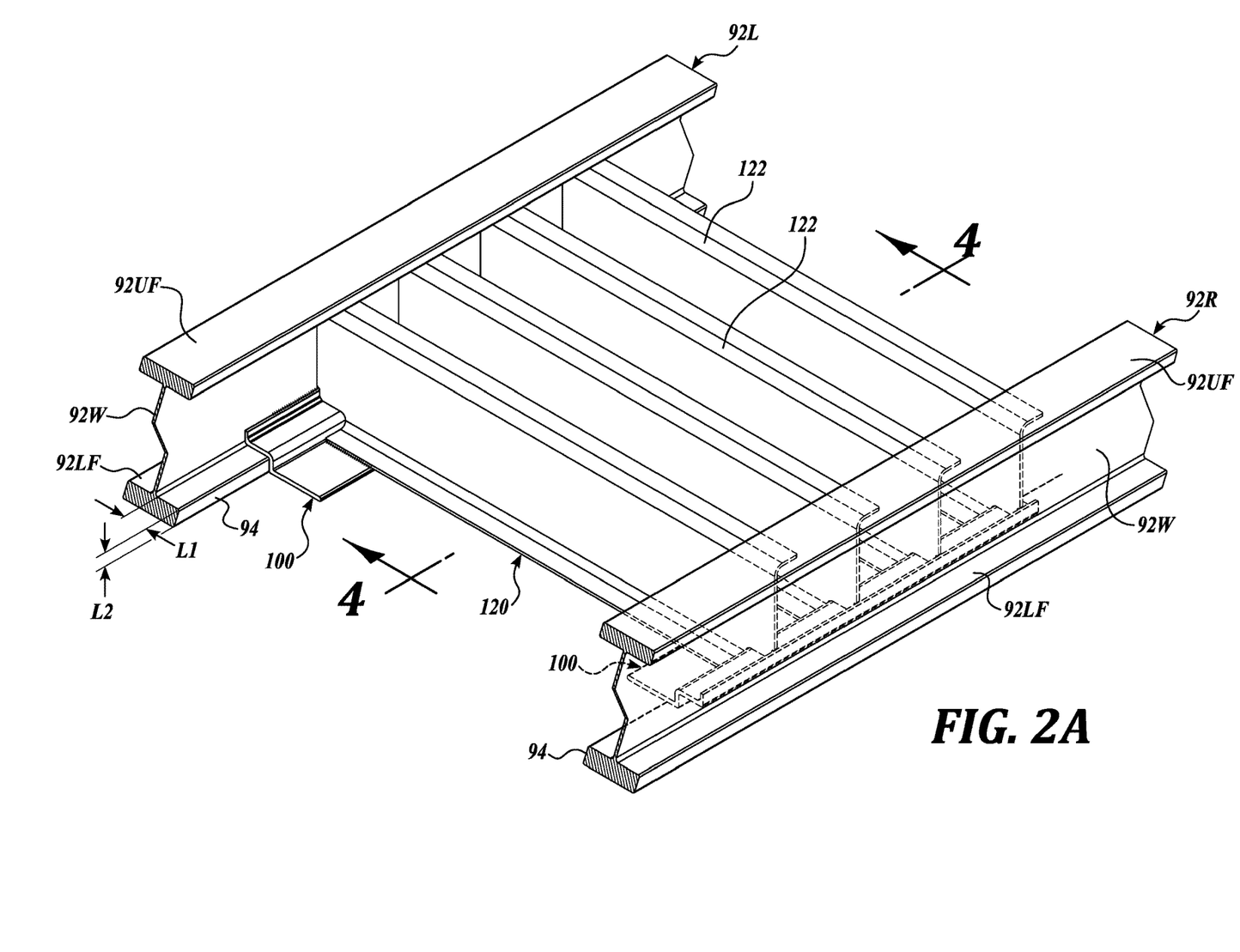
FIG. 2A is a perspective view of a crossmember subassembly fixed to left and right main beams using Z-rails in accordance with the present invention.
Figure 2B:
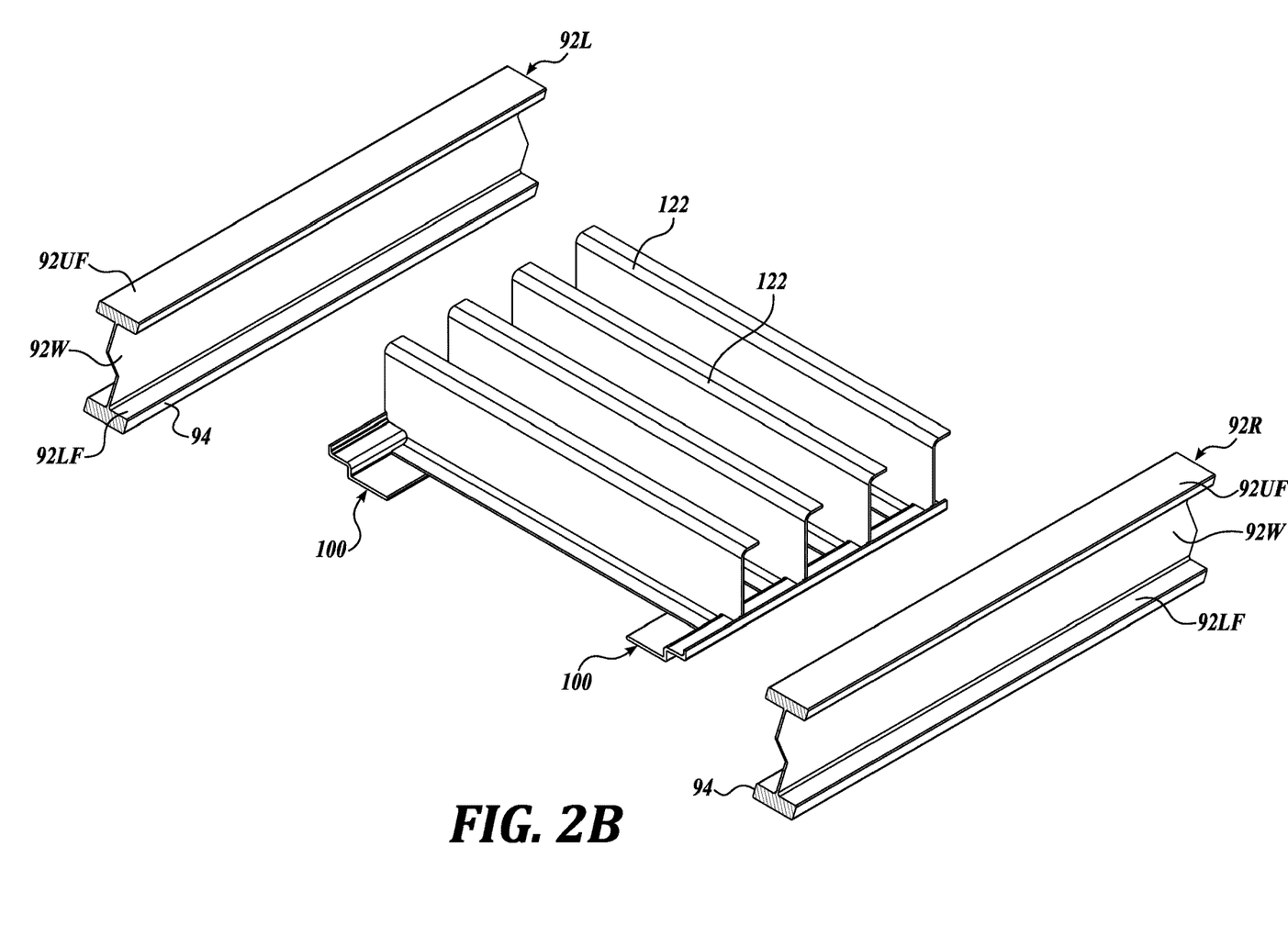
FIG. 2B shows the crossmember subassembly shown in FIG. 2A with the main beam shown spaced away.

FIG. 2A is a perspective view showing portions of a left main beam 92L and a right main beam 92R. A crossmember subassembly 120 is fixed to the main beams 92L, 92R. In this exemplary embodiment the main beams 92L, 92R are I-beams, for example, wide flange I-beams, each beam 92L, 92R having an upper flange portion 92UF, a lower flange portion 92LF, and a web portion 92W. The crossmember subassembly 120 is fixedly attached to the main beams 92L, 92R. The crossmember subassembly 120 includes a plurality of crossmembers 122 (four shown) that are fixedly attached to two oppositely disposed shaped attachment plates, referred to herein as Z-rails 100. The crossmembers 122 in this example provide support for a kingpin assembly (not shown). A corresponding view of the crossmember assembly 120 exploded from the main beams 92R, 92L is shown in FIG. 2B.

The crossmembers 122 are fixed to the Z-rails 100 in any convenient manner, for example, by welding, or with welding and attachment bolts. The crossmembers 122 are fixed to the Z-rails 100 before the crossmember subassembly 120 engages the main beams 92L, 92R. Therefore, welding the crossmembers 122 to the Z-rails 100 can be accomplished without causing any heating of the main beams 92L, 92R, avoiding any potentially adverse impact on the toughness of the tempered main beams 92L, 92R. In addition, the Z-rails simplify construction of the trailer by enabling the separate construction of unitized crossmember subassemblies (such as subassembly 120) that are attachable as a unit to the main beams 92L, 92R.

The crossmember subassembly 120 is positioned at a desired location on and between the lower flange portions 92LF of the main beams 92L, 92R, and is fixed to the main beams 92L, 92R, as discussed below. In some embodiments the crossmember subassembly may further include one or two upper Z-rails 100 fixed to an upper end of one or more associated crossmembers, with the upper Z-rails oriented to engage the upper flange portions 92UF of the main beams 92L, 92R.

Figure 3:
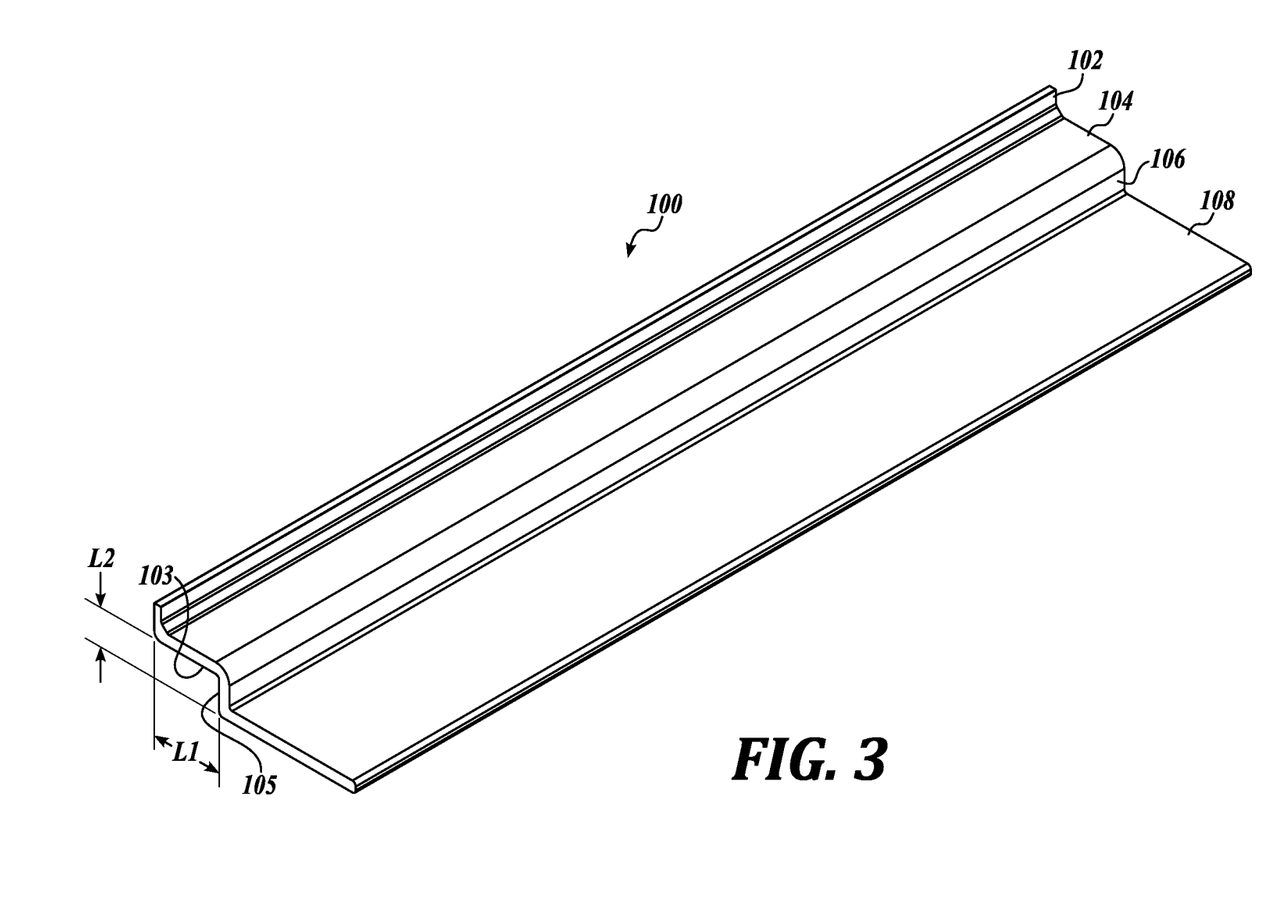
FIG. 3 is a perspective view of one of the Z-rails shown in FIG. 2B.

The Z-rails 100 will now be described in detail, with reference to FIG. 3 showing a perspective view of the Z-rail 100 in isolation. The Z-rail 100 is configured to engage a corresponding one of the main beams 92L or 92R. Although in the embodiment of FIG. 3 the Z-rail 100 is configured to attach to an I-beam, in other embodiments the Z-rail may be readily adapted to engage other flanged beams, including beams having adjacent portions or faces that are not perpendicularly disposed. The Z-rail 100 includes an upper vertical flange 102, an L-shaped middle portion comprising a horizontal leg 104 and a vertical leg 106, and a lower horizontal flange 108. The Z-rail 100 upper vertical flange 102 is oriented at a right angle to the horizontal leg 104, the horizontal leg 104 is oriented at a right angle to the vertical leg 106, and the vertical leg 106 is oriented at a right angle to the lower horizontal flange 108. The bottom face 103 of the horizontal leg 104 has a width L1 that is equal to the horizontal distance L1 from the web 92W to an inner face 94 of the main beam lower flange 92LF (see FIG. 2A). The outer (left) face 105 of the vertical leg 106 has a width L2 that is equal to the width L2 of the main beam lower flange 92LF (see FIG. 2A). Therefore, as seen most clearly in FIG. 2A, the upper vertical flange 102 abuts the main beam web 92W of the main beam 92L when the vertical leg 106 abuts the inner face 94 of the lower flange 92LF, and the lower horizontal flange 108 is substantially co-planar with a bottom face of the main beam 92L lower flange 92LF.

Figure 4:
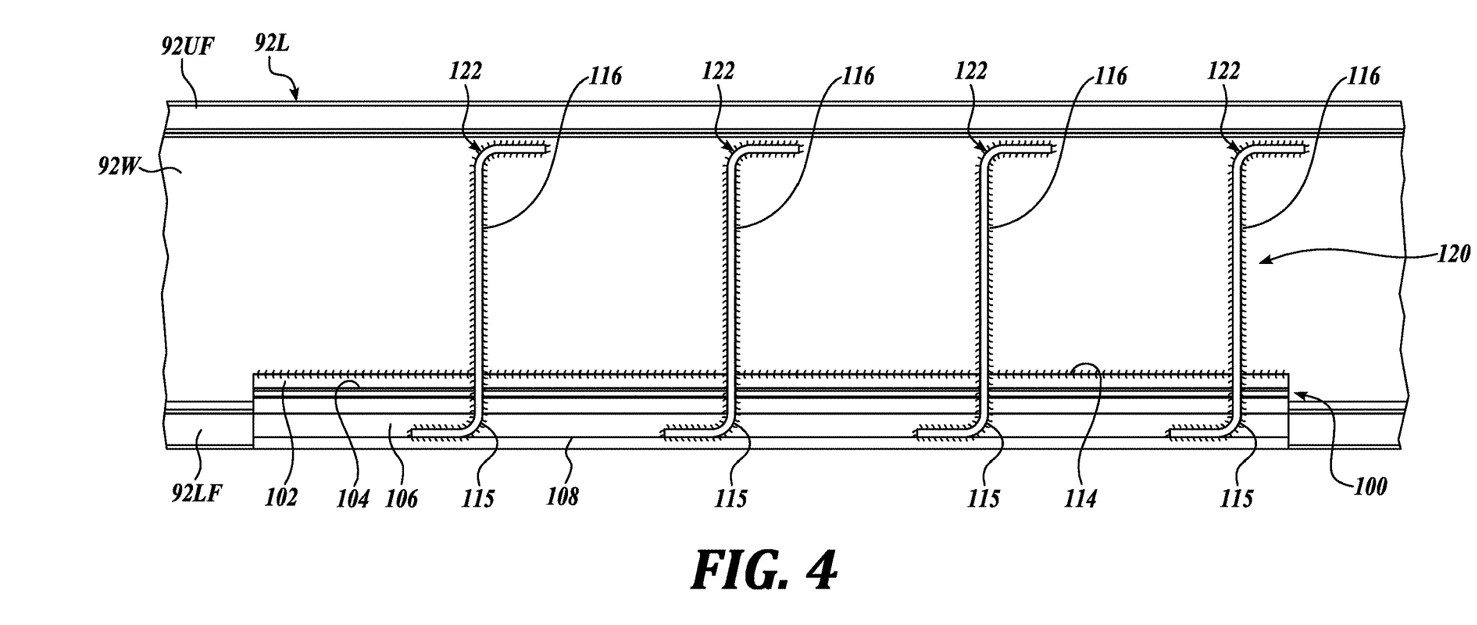
FIG. 4 is a sectional view of the crossmember subassembly and main beam through section 4-4 indicated in FIG. 2A.

FIG. 4 is a sectional side view through section 4-4 indicated in FIG. 2A. As described above the crossmember subassembly 120 is preassembled with the lower ends of the crossmembers 122 welded 115 (or otherwise fixed) to the Z-rails 100 prior to engaging the main beams 92L, 92R. The crossmember subassembly 120 is then positioned between and engaging the main beams 92L, 92R such that the upper vertical flanges 102 of corresponding Z-rails 100 abut corresponding main beam webs 92W. The Z-rail 100 upper vertical flange 102 is then welded 114 to the corresponding main beam web 92W. As shown in FIG. 4, optionally an upper portion of the crossmembers 122 may be welded 116 directly to the main beam web 92W.

It will be appreciated by persons of skill in the art that the risk of fracture in the main beams 92L, 92R is primarily in the upper and lower flanges 92UF, 92LF, and that the toughness properties in the web 92W is typically not a concern. Therefore, a loss of temper or toughness in the web 92 due to welding the Z-rails 100 and the crossmembers 122 to the web 92W is of secondary consideration. The Z-rails 100 allow crossmembers 122 to be fixedly attached to the main beams 92L, 92R without directly heating the flanges 92LF, 92UF of the main beams 92L, 92R, and therefore without compromising the tempering of the flanges, and therefore without reducing local toughness properties of the main beams 92L, 92R.

Figure 5:
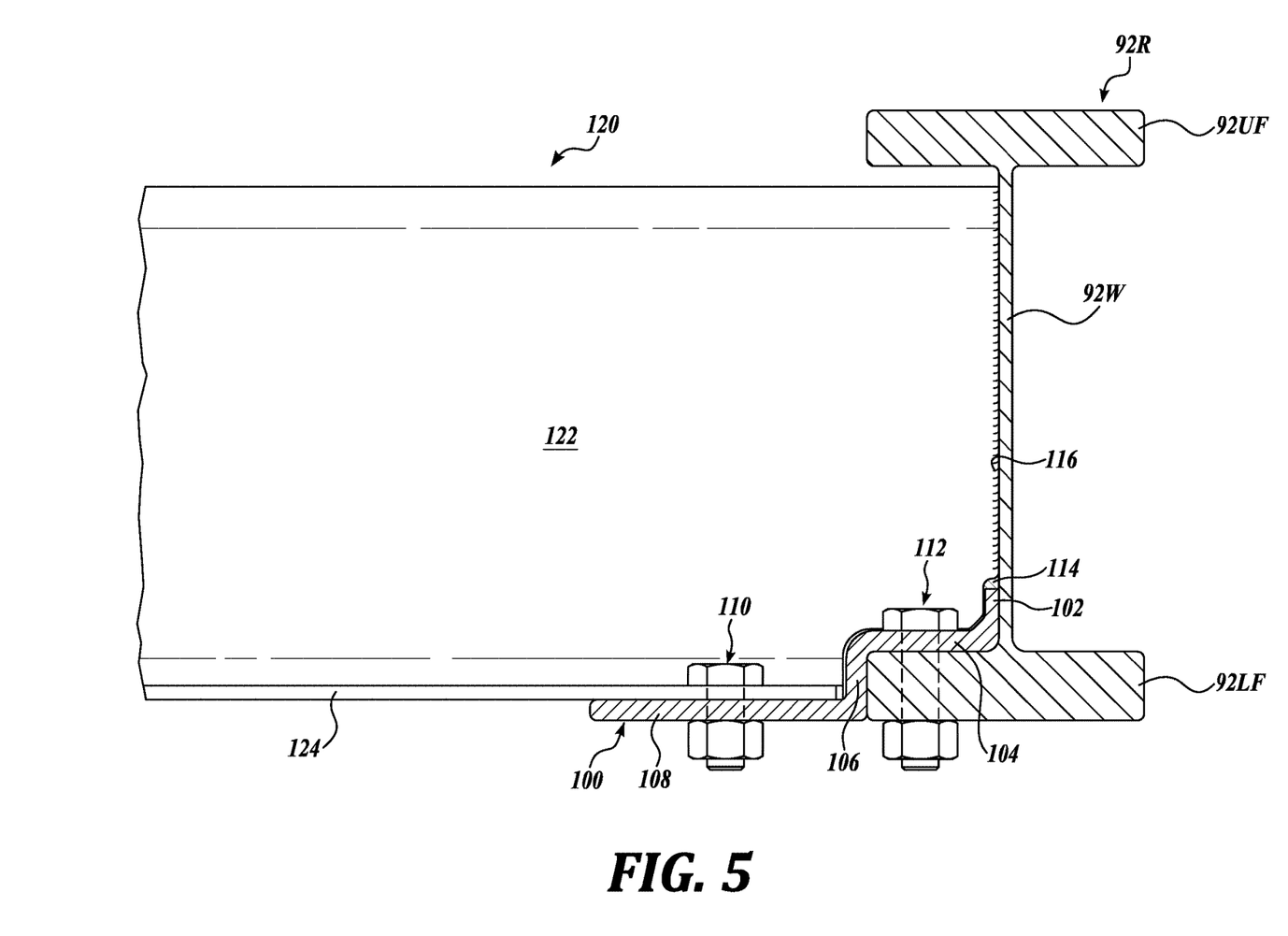
FIG. 5 is a detail front view of one side of the crossmember subassembly and associated main beam shown in FIG. 2A.

FIG. 5 is a detail front view showing the right side of the assembly shown in FIG. 2A, and further including optional first bolt assembly 110 and optional second bolt assembly 112. In this embodiment, the lower flanges 124 of the crossmembers 122 are bolted to the lower horizontal flange 108 of the Z-rails 100 with the first bolt assembly 110. The bolted connection may be used rather than, or in addition to, the welded connection 115 shown in FIG. 4. In this embodiment the Z-rail 100 may also be bolted to the lower flange 92LF of the main beam 92R with the second bolt assembly 112, which extends through the horizontal leg 104 of the Z-rail 100.

Figure 6A:
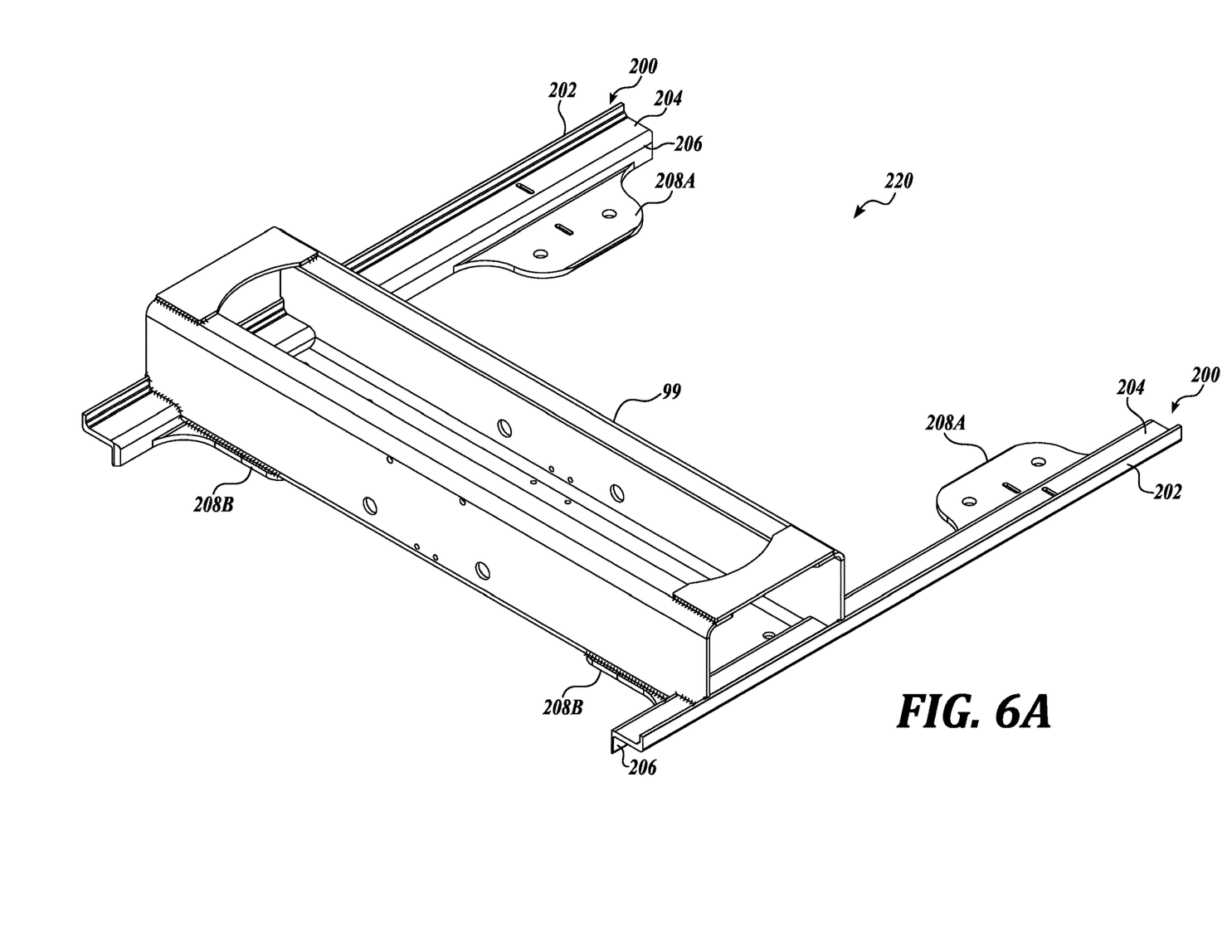
FIG. 6A is a perspective view of a crossmember subassembly with a suspension crossmember attached to a second embodiment of Z-rails in accordance with the present invention.
Figure 6B:
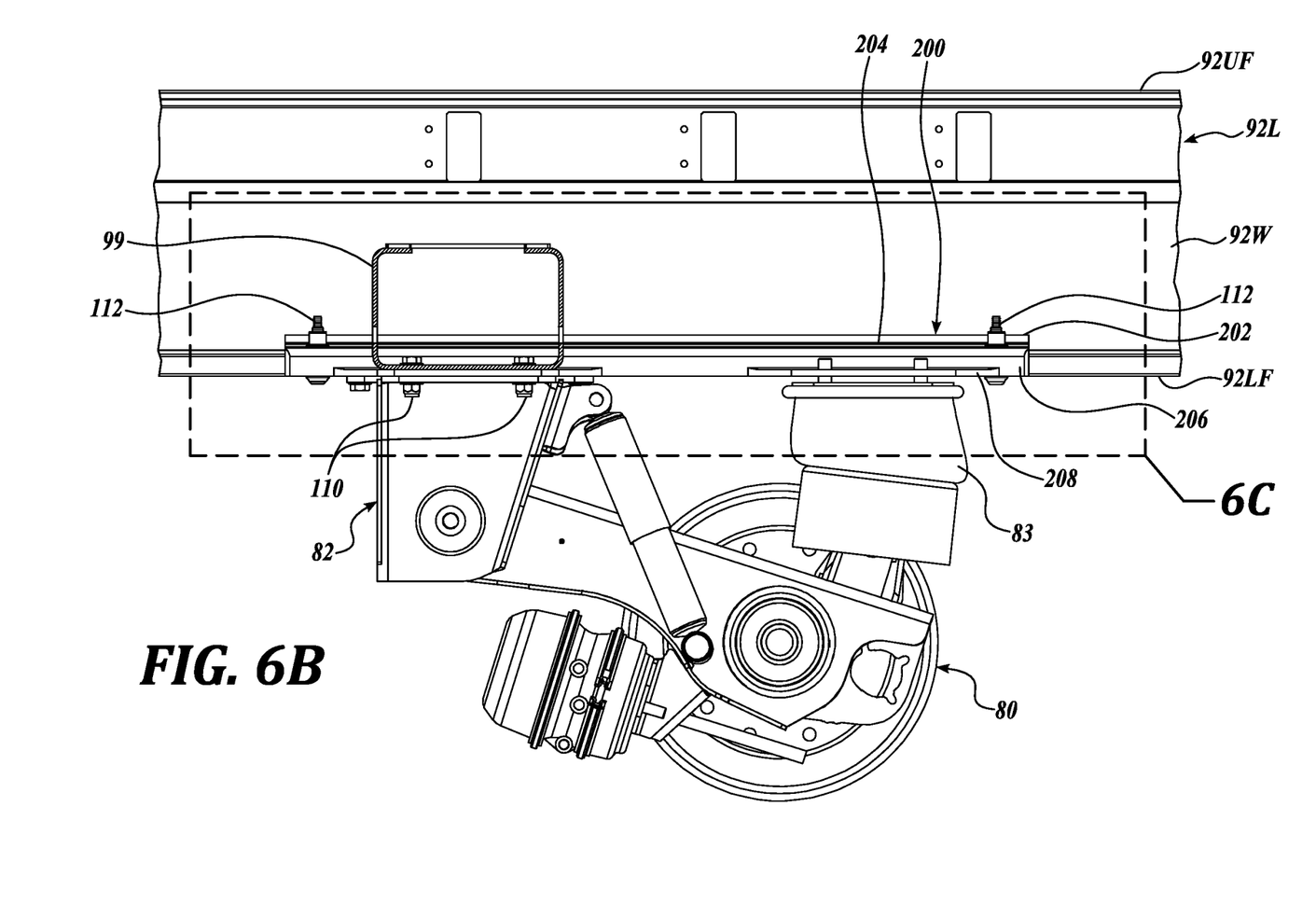
FIG. 6B is a section view of the crossmember subassembly shown in FIG. 6A attached to a main beam of the trailer and illustrating a suspension assembly.
Figure 6C:
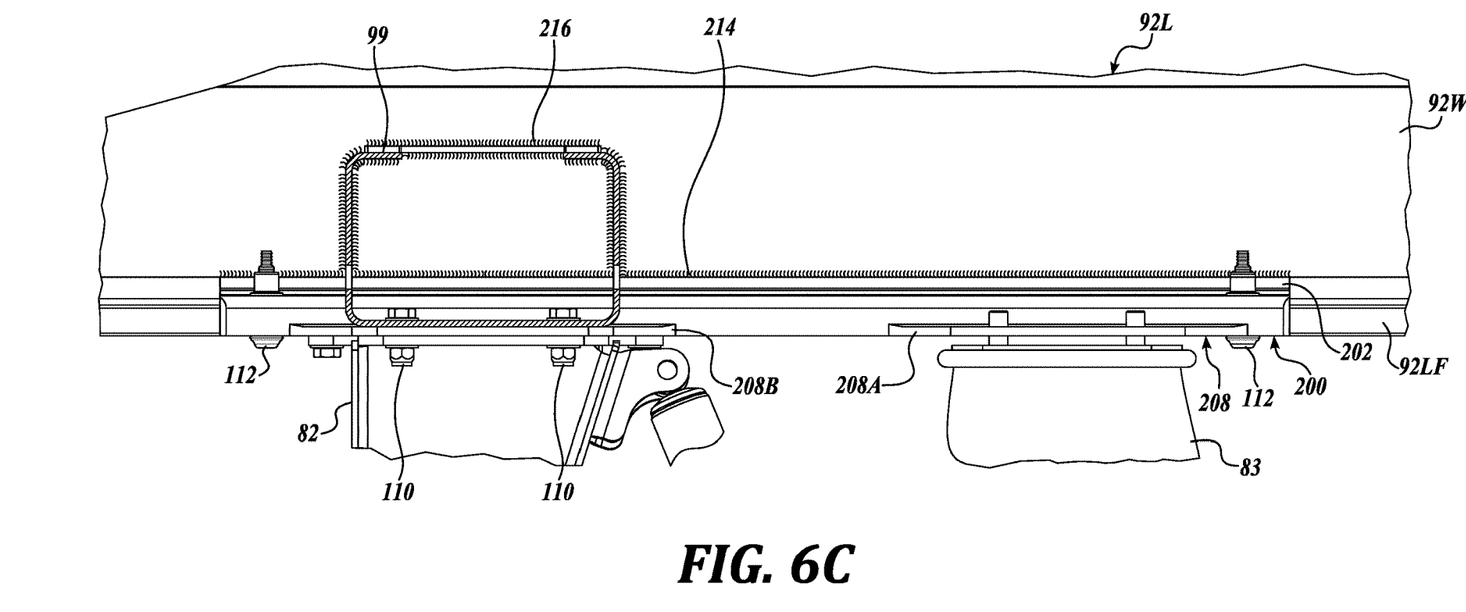
FIG. 6C is a detail view of the crossmember subassembly indicated by detail box C in FIG. 6B.

FIGS. 6A-6C illustrate another embodiment showing a pair of Z-rails 200 mounting a crossmember 99 for a trailer suspension assembly 80 to main beams 92L, 92R. FIG. 6A shows a crossmember subassembly 220 including a prior art suspension crossmember 99 fixed to a pair of parallel, spaced-apart Z-rails 200. Each of the Z-rails 200 in this embodiment include an upper vertical flange 202, and an L-shaped portion comprising a horizontal leg 204 and a vertical leg 206 extending from the upper vertical flange 202, similar to the corresponding portions of the Z-rail 100 shown in FIG. 3. A lower horizontal flange 208 (FIG. 6B) extends from the vertical leg 206 and comprises a first portion 208A and a second portion 208B (FIG. 6C). The first and second portions 208A, 208B include apertures configured to engage suspension components 82, 83 positioned below the Z-rails 200, as shown in FIG. 6B which shows the suspension assembly 80 located substantially below the Z-rails 200.

Referring to the detail view in FIG. 6C, the upper vertical flange 202 of the Z-rail 200 is welded 214 to the main beam web 92W, and the suspension crossmember 99 is also welded 216 to the main beam web 92W. Neither the Z-rail 200 nor any of the suspension components (e.g., crossmember 99) are welded to the main beam lower flange 92LF. Second bolt assemblies 112 extend through corresponding apertures in the horizontal leg 204 of the Z-rail and the main beam lower flange 92LF to further secure the Z-rails 200 to the main beam 92L. First bolt assemblies 110 extend through corresponding apertures in the suspension assembly 82 crossmember 99 and the lower horizontal flange 208 to secure the suspension components to the Z-rails 200. The suspension crossmember 99 may also be welded 216 to the web 92W. Again, no component is welded to the lower flange 92LF, which therefore retains its design tempering and toughness.

Similar to the Z-rail 100 shown in FIG. 3, the lower face of the horizontal leg 204 of the Z-rail 200 has a width L1 equal to the distance L1 from the web 92W to an inner face 94 of the main beam lower flange 92LF, and the outer face of the vertical leg 206 has a width L2 that is equal to the vertical width L2 of the main beam lower flange 92LF (see FIGS. 2A and 3).

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for fixedly attaching a crossmember to a vehicle frame having a flanged first beam and a flanged second beam, wherein the first and second beams each comprise a web and a flange extending away from the web, and wherein the flange defines an upper surface having a first width and an end surface having a second width, the method comprising:
   fabricating a crossmember subassembly by fixedly attaching a first elongate attachment member ("first Z-rail") to one end of the crossmember and fixing a second elongate attachment member ("second Z-rail") to an opposite end of the crossmember, the first and second Z-rails each comprising:
   (i) a first end section,
   (ii) an L-shaped portion comprising a horizontal leg extending from the first end section and a vertical leg extending from the horizontal leg, and
   (iii) a second end section extending from a bottom end of the vertical leg;
   wherein the horizontal leg of the L-shaped section defines a lower surface having a width equal to the flange first width and the second leg defines an outer surface having a width equal to the flange second width;
   positioning the crossmember subassembly on the first and second flanged beams such that the horizontal leg of the first Z-rail abuts the first surface of the first beam flange and the vertical leg of the first Z-rail abuts the end surface of the first beam flange, and such that the horizontal leg of the second Z-rail abuts the first surface of the second beam flange and the vertical leg of the second Z-rail abuts the end surface of the second beam flange; and welding the first end section of the first Z-rail to the web of the first beam without directly heating the first beam flange, and welding the first end section of the second Z-rail to the web of the second beam without directly heating the second beam flange.

2. The method of claim 1, wherein the first beam and the second beam comprise I-beams or channel beams.

3. The method of claim 1, wherein the crossmember comprises a plurality of crossmembers and the method comprises fixing all of the plurality of crossmembers to the first and second elongate attachment members.

4. The method of claim 1, wherein the first Z-rail second end section is perpendicular to the first Z-rail vertical leg.

5. The method of claim 4, wherein a bottom surface of the first Z-rail second end section is coplanar with a bottom surface of the flange of the first beam.

6. The method of claim 1, wherein fabricating the crossmember subassembly further comprises bolting the crossmember flange to the second end section of the first and second Z-rails.

7. The method of claim 1, further comprising bolting the L-shaped portion of the first Z-rail to the first beam flange and bolting the second Z-rail to the second beam flange.

8. The method of claim 1, wherein the second end sections of the first and second Z-rails comprise a first portion and a second portion, wherein the second portion is spaced apart from the first portion.

* * * * *